(12) United States Patent
Paxton

(10) Patent No.: US 10,479,715 B2
(45) Date of Patent: Nov. 19, 2019

(54) PROCESS FOR THE TREATMENT OF HIGH SULPHATE WATERS

(71) Applicant: Richard George Paxton, West Midlands (GB)

(72) Inventor: Richard George Paxton, West Midlands (GB)

( * ) Notice: Subject to any disclaimer, the term of this patent is extended or adjusted under 35 U.S.C. 154(b) by 159 days.

(21) Appl. No.: 15/303,973

(22) PCT Filed: Apr. 20, 2015

(86) PCT No.: PCT/IB2015/052870
§ 371 (c)(1),
(2) Date: Oct. 13, 2016

(87) PCT Pub. No.: WO2015/162540
PCT Pub. Date: Oct. 29, 2015

(65) Prior Publication Data
US 2017/0036936 A1 Feb. 9, 2017

(30) Foreign Application Priority Data

Apr. 22, 2014 (GB) .................................. 1407101.3

(51) Int. Cl.
| | |
|---|---|
| *C02F 9/00* | (2006.01) |
| *C02F 1/52* | (2006.01) |
| *C02F 1/58* | (2006.01) |
| *C02F 1/66* | (2006.01) |
| *C02F 1/00* | (2006.01) |
| *C02F 101/10* | (2006.01) |
| *C02F 103/10* | (2006.01) |
| *C02F 101/20* | (2006.01) |

(52) U.S. Cl.
CPC ................ *C02F 9/00* (2013.01); *C02F 1/529* (2013.01); *C02F 1/5236* (2013.01); *C02F 1/5245* (2013.01); *C02F 1/58* (2013.01); *C02F 1/66* (2013.01); *C02F 2001/007* (2013.01); *C02F 2101/101* (2013.01); *C02F 2101/105* (2013.01); *C02F 2101/20* (2013.01); *C02F 2103/10* (2013.01); *C02F 2301/046* (2013.01); *C02F 2301/08* (2013.01)

(58) Field of Classification Search
CPC ....................................................... C02F 9/00
See application file for complete search history.

(56) References Cited

U.S. PATENT DOCUMENTS

| | | | |
|---|---|---|---|
| 2014/0042061 A1* | 2/2014 | Wallace | .................... C02F 9/00 210/149 |
| 2014/0076822 A1* | 3/2014 | Bluemle | ................ B01J 20/261 210/728 |

FOREIGN PATENT DOCUMENTS

| | | |
|---|---|---|
| DE | 41 23 885 A1 | 1/1993 |
| WO | 2014/033361 A1 | 3/2014 |

OTHER PUBLICATIONS

International Search Report dated Aug. 25, 2015 issued in corresponding International Application No. PCT/IB2015/052870.

\* cited by examiner

*Primary Examiner* — Peter Keyworth
(74) *Attorney, Agent, or Firm* — Nath, Goldberg & Meyer; Joshua B. Goldberg

(57) ABSTRACT

The present invention relates to an improved process for treating high sulphate waters. In particular, the present invention relates to an improved process by which ettringite is used to treat high sulphate waste waters by controlled precipitation of sulphate and metal ions.

6 Claims, 2 Drawing Sheets

PROCESS FOR THE TREATMENT OF HIGH SULPHATE WATERS

This is a National Phase Application filed under 35 U.S.C. 371 as a national stage of PCT/IB2015/052870, filed Apr. 20, 2015, claiming the benefit from United Kingdom Application No. 1407101.3, filed Apr. 22, 2014, the content of each of which is hereby incorporated by reference in its entirety.

FIELD OF APPLICATION OF THE INVENTION

The present invention relates to an improved process for the treatment of high sulphate waters. In particular, the present invention relates to an improved process for the removal of sulphates, phosphates and dissolved metals, by precipitation, from high-sulphate waters.

BACKGROUND TO THE INVENTION

Throughout the world, there are many situations where the results of industrial and mining activities create large volumes of waste waters which contain high concentrations of sulphates. Most of these waste waters also contain substantial concentrations of dissolved metals, typically including iron, manganese, lead, zinc, copper, arsenic and nickel. These waste waters frequently have a low pH.

Many of these waste waters cause substantial environmental problems and, in a number of cases, the entity which created the problem is no longer in existence or is unable to carry the costs associated with existing technologies for managing the waste water in a satisfactory manner.

There are a large number of technologies available for the treatment of these waste waters and for recovering the water to a quality which is fit for re-use at the site that produced the waste water, for use by others or for safe discharge into the environment. However, all of these technologies come with an associated cost. In addition, these technologies create by-products and process residues. These by-products and process residues are derived from the contaminants which have to be removed from the waste water as well as from components within the chemical reagents which have to be used within the particular treatment process that is being applied. Frequently, the disposal costs associated with these by-products and process residues greatly exceed the purchase costs of the necessary treatment reagents.

In most instances, these by-products and process residues contain components which would have a marketable value (often a substantial value) if it were not for the other components that are frequently also present within the bi-product or process residue. These other components are typically derived from the waste water or they arrive as contaminants during the course of treatment. There is therefore a major need for low cost technologies capable of treating and recovering these waste waters which, ideally, would also create residues with a marketable value rather than a disposal cost.

Most of the currently applied technologies seek to remove the sulphate content from the waste water in the form of gypsum. Gypsum has a low but significant solubility. This means that following the precipitation of the gypsum there is a residual sulphate concentration within the water; typically between about 3 and 10 times the maximum acceptable concentration for discharge to the environment or for drinking water purposes.

The normal means that are applied to the waste water in order to create an acceptably low sulphate concentration include membrane-based processes: reverse osmosis, nano-filtration or a dialysis based process. These membrane-based processes have both a high capital cost and a high operating cost. In addition, they frequently suffer from a number of blinding and fouling mechanisms which can result in frequent shut downs for cleaning and to a short operating life for the membranes themselves.

An alternative technology is to exploit the very much lower solubility of ettringite. Ettringite has a complex crystal structure. This structure is able to include many other ionic components within the crystal lattice, both anions and cations. Ettringite has the generally accepted formula of: $Ca_6Al_2(SO_4)_3(OH)_{12} \cdot 26H_2O$.

For most multi-valent metals, the pH at which the solubility of the hydroxide is at a minimum is specific to the respective metal. Also, the rate of change within the solubility of each of these hydroxides as the pH is lowered or raised is also slightly different for each of the metals, especially at pH levels which are above the pH of their lowest solubility. This means that as the pH is raised within an acidic solution that contains a number of different metals, the metal with the lowest pH for its minimum solubility tends to be the first to be precipitated from the mixture, followed by the metal with the next lowest pH for its minimum solubility and so on as the pH is raised.

The initial concentrations of the respective metals within the solution will also influence the pH at which each metal hydroxide begins to precipitate. For most industrial or mining derived waste waters, iron is typically present in large quantities. Iron has two principal oxidation states, ferrous Fe (II) and ferric Fe (III). Ferric iron is normally at its lowest solubility at a pH of between pH 3.5 and 4.0, whereas the normal minimum solubility for ferrous iron is in the region of pH 9.5. The equivalent pH for aluminium is between pH 6 and 7, whereas for most of the other transition metals, the normal minimum solubility pH occurs between pH 8 and pH 10. Manganese is the typical exception for the metals which are normally present at relatively high concentration within many of the waste waters that are derived from heavy industry and from mining activities. It has a pH for its minimum solubility of around pH 10.5 to pH 11. The equivalent pH for both silver and cadmium is in the region of pH 12.

Given the above, it can be readily appreciated that, as the pH of a typical metals containing waste water is raised, most of the Fe (III) will be precipitated before any substantial amounts of aluminium are precipitated. Additionally, most of the aluminium will be precipitated before any substantial amounts of Fe (II) or any of the other multi-valent metals are precipitated.

Similarly, by the time the pH has been raised to that which is necessary for the practical precipitation of ettringite virtually all of the likely multivalent metals within the solution will have been precipitated.

At a high pH (above its minimum solubility), aluminium exists in solution predominantly as the hydrated negative ion $Al(OH)_4^-$. At low pH (below its minimum solubility), it exists as a positive ion. The degree of hydration of the positive ion varies from $Al^{3+}$ at low pH through $Al(OH)^{2+}$ to $Al(OH)_2^+$ as the pH rises towards the minimum solubility. As the pH is lowered, so the solubility of the various aluminium species increases. Also, as the pH is lowered, the number of hydrogen ions that are used in order to create the higher charge on each aluminium ion will increase. The net result of this behaviour is that in order to form ettringite, four $OH^-$ ions are needed per molecule of ettringite, together with two $Al(OH)_4^-$ ions, 3 sulphate ions and 6 calcium ions.

However, when an ettringite molecule is dissolved at low pH, it can release up to 12 hydroxide ions, depending on the pH linked degree of hydration of the aluminium ions. This means that per unit of calcium, the neutralising capability of ettringite under low pH conditions is the same as the neutralising capability of slaked lime.

Ettringite crystals require a high pH and sufficient aluminium, as well as the necessary calcium and sulphate in order for them to grow. As a result of the typically acidic nature and the high metals content of the waste waters that are often associated with former mine workings, a substantial quantity of neutralising medium has to be added before ettringite can be created. Lime, because of its relatively low price and general availability, is frequently used to supply this neutralising function. Additionally, this input of lime is normally able to provide the necessary calcium input for an effective ettringite based treatment process.

Usually, if the sulphate content of the waste water is high enough, gypsum is precipitated within a first stage of the treatment process. Preferably, the precipitated solids are then removed before the water is routed to a second treatment stage. Within this second treatment stage, a water soluble aluminium reagent is usually added, together with more lime. An example of this treatment process is the CESR Process where the soluble aluminium reagent is a proprietary reagent powder. The process was developed within Eastern Europe and has been widely applied to mining related waste waters within Europe.

In most situations the aluminium reagent has a prohibitively high price. This has led to a number of developments whereby most of the aluminium is recovered from the ettringite product and re-used within this second treatment stage. Depending on the specifics of the particular aluminium recovery process that is applied, it is usual for a large amount of additional gypsum residue to be created.

Once the ettringite that has been produced by the treatment process has been removed from the water (usually by a combination of gravity settlement and filtration) the ettringite can be re-dissolved within a lower pH environment. Some of the existing technologies use sulphuric acid, for example, within the SAVMIN Process, to create and maintain this lower pH environment. Others, for example, Veolia in South America, use hydrochloric acid, or a mixture of sulphuric and hydrochloric acid.

With careful control, the pH can be maintained at a level which is low enough for the ettringite to dissolve but high enough so that the aluminium that is released from the ettringite is immediately precipitated in the form of amorphous aluminium hydroxide. At the same time, the calcium and the sulphate portion of the ettringite is normally precipitated in the form of gypsum. Finally, the mixture has to be separated into a gypsum product or residue and a suitably pure aluminium hydroxide for return to the sulphate removal stage within the overall process. For economic reasons, the gypsum must contain as little aluminium as possible.

Within the SAVMIN Process, the slow rate of crystallisation of gypsum is exploited. The aluminium hydroxide can be made to precipitate rapidly and providing the resultant precipitate is removed rapidly from the reaction mixture, there is relatively little gypsum contamination within the aluminium hydroxide. The gypsum is then precipitated within a subsequent stage, where the kinetics of precipitation are normally assisted by a gypsum seeding process using either fresh or recycled gypsum.

Within the Veolia Process, the addition of the hydrochloric acid to the separated ettringite creates a strong solution of calcium chloride. Calcium chloride is an extremely soluble salt and a very high ionic strength solution can be created. Under these conditions it is possible to increase the solubility of gypsum to the extent that with appropriate control over the water content of the mixture, only the aluminium hydroxide is precipitated and the sulphate that is released remains in solution as the ettringite is dissolved. This process unfortunately creates a concentrated brine residue which requires disposal.

An alternative approach is to utilise a substantially lower pH for the dissolution of the ettringite. With this approach, the aluminium remains in solution and the gypsum can be separated as a high purity product by simple gravity separation, filtration or by other appropriate means. One down side of this option is the cost of the extra acid to carry out this dissolution. Additionally, extra lime is needed within the ettringite production stage in order to raise the pH of the recovered aluminium solution to the high pH that is needed for ettringite crystallisation. Further, if hydrochloric acid or another monovalent acid is used for this pH reduction, either a concentrated brine is created (for example, if the aluminium is precipitated as the hydroxide so as to enable only the aluminium hydroxide to be returned to the ettringite precipitation stage), or a high concentration of chloride or other monovalent anion is introduced into the product water.

Unfortunately, the reagent costs associated with these aluminium recovery options, plus the inevitable aluminium losses which occur within them, have meant that the currently practiced ettringite-based processes represent an expensive method for reducing the sulphate concentration.

Providing the ionic strength of the solution is not too high, gypsum precipitation is normally able to achieve a sulphate concentration in the order of 1500 to 3000 mg/liter. This is considerably above the 100 to 25 mg/liter of sulphate that is required for many of the options for either the re-use or the discharge of the treated water. This, combined with the high operating costs of the currently practiced ettringite based processes, have led to a general preference by water treatment specialists for the use of membrane-based approaches rather than ettringite for this sulphate reduction step.

The present invention proposes a recycling method for the aluminium content of ettringite which does not require the use of an acid addition step. Instead, it exploits the typically acidic nature of the waste water, along with the typical iron (and other multi-valent metal) content of the waste water that is used as the feed water for the process.

OBJECT OF THE INVENTION

Accordingly, it is an object of the present invention to provide a process for the improved treatment of high-sulphate waters using chemical methods which will address the shortcomings associated with the prior art and the currently employed technology.

SUMMARY OF THE INVENTION

According to a first aspect thereof, the present invention provides a process for the treatment of high-sulphate waters, said process
  including at least two reaction stages and one or more clarification stages serving to separate precipitated solids from partially treated water,
  wherein said first reaction stage utilises a source of ettringite in order to precipitate metals, sulphate and other contaminants from the feed water.

First Reaction Stage

In terms of the present invention, high sulphate water enters into a first reaction stage, where a source of ettringite is used instead of, or in addition to, lime and/or a calcium-containing and/or hydroxide-containing material. The addition(s) are used to raise the pH to between pH 4.0 and pH 4.5, causing precipitation of some multivalent metals. Depending on the sulphate concentration within the high sulphate water, gypsum may also be precipitated.

In an alternative embodiment of the invention, $Fe(OH)_3$ precipitate and, if present, gypsum are separated prior to additional additions of ettringite and/or lime and/or calcium-containing and/or hydroxide-containing material. The precipitates that are separated from the process mixture can be either discarded, or processed using techniques well understood in the art to produce gypsum of higher purity and a $Fe(OH)_3$ rich product.

The additional additions, in turn, raise the pH further, causing $Al(OH)_3$ and gypsum to also precipitate. Depending on the value to which the pH is raised, other components may also precipitate. After precipitation, the precipitates can be separated from the process mixture and either discarded, or processed using techniques well understood in the art to produce gypsum of higher purity and an $Al(OH)_3$ rich product.

In a preferred embodiment, hydrocyclone technologies would be used to perform the additional processing of the precipitates. In an alternative embodiment of the invention, gypsum so precipitated and separated would be further purified using techniques well known in the art and the components separated from the gypsum would be returned to the first reaction stage as an input material. In a preferred embodiment, hydrocyclone-based washing, preferably using some or all of the high sulphate water as a wash fluid, would be used as a purifying technique.

Further Reaction Stage

In terms of the present invention, a further reaction stage would be used to precipitate ettringite from partially treated high sulphate water. In this stage, a stream rich in $Al(OH)_3$ from previous and/or subsequent reaction/separation stages or an additional aluminium containing reagent or a combination of both would be added to the partially treated high sulphate water. Additionally, slaked lime, burnt lime or another suitable hydroxide reagent would be added. The proportions of the added materials would be of sufficient quantities and ratios to encourage the formation of ettringite within the reactor while avoiding the creation of other calcium compounds or other impurities.

Additional Reaction Stage

In an alternate embodiment of the invention, an additional reaction stage is used to raise the pH of the partially treated high sulphate water exiting the first reaction stage. The pH would be raised using alkaline materials, the materials including but not limited to: burnt lime, slaked lime and ettringite. The increased pH, the specific value being process dependent, would result in a precipitate comprising hydroxides, hydrated oxides, silicates, phosphates, carbonates, basic carbonates and other metallic impurities. In a preferred embodiment, these precipitates would then be separated from the high sulphate water to become a process discard. In an alternative embodiment, the discard would be routed to a suitable metals separation and recovery process.

In a preferred embodiment, each reaction stage would consist of a multi-compartment reactor, the reactor including suitable stirring and mixing arrangements within each compartment. In a further embodiment, the compartments would be arranged in series. In an alternative embodiment, batch reactors would be used. In another alternative embodiment, a sequenced batch reactor would be employed. In another alternative embodiment, a sequence of individual stirred reactors arranged in series would be employed.

In a preferred embodiment, a sludge recycle would be included in addition to the reaction stages so as to optimise the availability of seed crystals to the precipitation processes.

In an embodiment of the invention, control of calcium, sulphate and aluminium levels within each reaction stage would be implemented in order to keep the relative proportions of these components substantially stochiometric. In a further embodiment, the proportion of aluminium would be controlled such that it would be the first of these components to be depleted. In a further embodiment, the calcium to sulphate ratio would be controlled by adjusting the amount of ettringite and hydroxide reagents that are added to one or more of the reactors.

In an embodiment of the invention, the product slurry would contain a mixture of ettringite crystals and other fine precipitates. These precipitates may include manganese hydroxides, manganese hydrated oxides, magnesium hydroxides, magnesium hydrated oxides, magnesium silicate, other hydroxides, other hydrated oxides, silicates, carbonates and any trace compounds that may be present. However, the ability of ettringite to incorporate within itself both anions and cations, especially the multivalent ones, will typically result in the dissolved concentrations of usually all of the multivalent anions and cations (except sulphate and calcium) being substantially below their normally expected solubility limits within the aqueous phase of the product liquor from the further reaction stage. The precipitated solids would be separated from the treated water using suitable solid separation processes, as known and described in the art.

In a further embodiment of the invention, crystalline ettringite within the precipitate from the further reaction stage would be separated into an ettringite concentrate using techniques known in the art. In a preferred embodiment, separation would include hydrocyclone-based techniques. In a further embodiment, ettringite concentrate that has been stored within a buffer storage facility would be used during process restart following maintenance or where the high sulphate water contains insufficient aluminium and/or where there is a deficiency of aluminium reagents. In another embodiment, buffer storage would also include facilities for the storage of $Al(OH)_3$ and/or other precipitates produced by the reaction processes.

In terms of the present invention, the product of the further reaction stage would consist of clarified water with a high pH and low concentration of sulphate and calcium. In a preferred embodiment, the pH of the clarified water stream would be between pH 10.8 and pH 12.0, and the concentration of sulphate and calcium would each be less than 100 mg/l. In a further embodiment, the concentration of dissolved aluminium would be less than 10 mg/l. In a further embodiment, the concentration of sulphate and calcium would each be under 50 mg/l, with the concentration of aluminium being less than 5 mg/l.

In a further embodiment of the invention, the clarified water produced by the further reaction stage would be treated using a pH reducing agent. In a preferred embodiment of the invention, the pH reducing agent would include carbon dioxide, sulphuric acid and/or hydrochloric acid. In a further embodiment of the invention, the pH of the clarified water would be between pH 7.0 and pH 9.5. In an alternative embodiment of the invention, a final separation stage known in the art would be used to remove particulate produced by pH adjustment of the clarified water. In a preferred embodiment, the final separation stage would include a sand filter. In a further embodiment, the sand filter may be of the self-cleaning type. In an alternative embodiment of the invention, a further pH adjustment stage would be used to control the concentration of metallic contaminants and/or the dissolved nitrogen content of the clarified water. In a preferred embodiment, the pH would be adjusted using techniques known in the art, to a range of pH 6.0 to pH 7.5. In a further embodiment, an additional solids removal stage would be used to remove precipitate following final pH adjustment. In a further embodiment, this solids removal stage and/or a further stage would include any of the following, in any combination: biological-based separation, membrane-based separation and/or ion-exchange-based separation. In an alternative embodiment, a ferric Fe(III)-based treatment reagent, or a reagent with similar capabilities, would be added to any pH adjustment step(s) in order to control manganese, arsenic, selenium, cadmium, boron and other trace components in the clarified water stream.

Advantages

An advantage of the present invention is economical in that the reuse of reactor products, in the form of $Al(OH)_3$, ettringite, $Fe(OH)_3$ and gypsum is expected to substantially lower operating costs for facilities employing this system to treat sulphate-rich water. Additionally, the present invention would remove the need for easily-fouled membrane-based and/or resin based systems for the treatment of sulphate-rich water.

BRIEF DESCRIPTION OF THE DRAWINGS

The invention will now be described in more detail, by way of example only, with reference to the accompanying figures in which.

The foregoing and other objects, features and advantages of the present invention will become more apparent from the following description of certain embodiments of the present invention by way of the following non-limiting examples.

DESCRIPTION OF THE INVENTION

Figure 1:
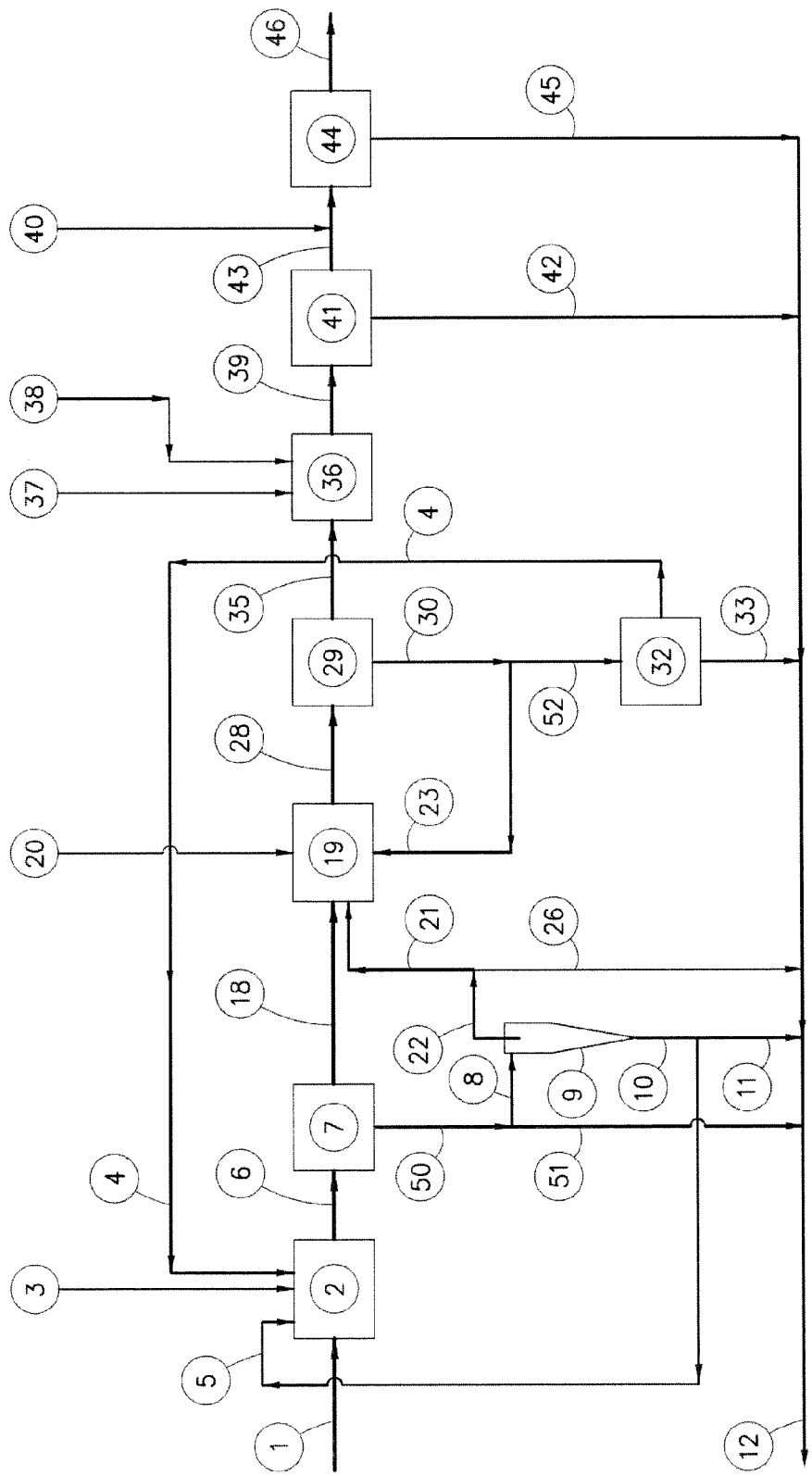
FIG. 1 depicts a diagram illustrating the process of the present invention.
Figure 2:
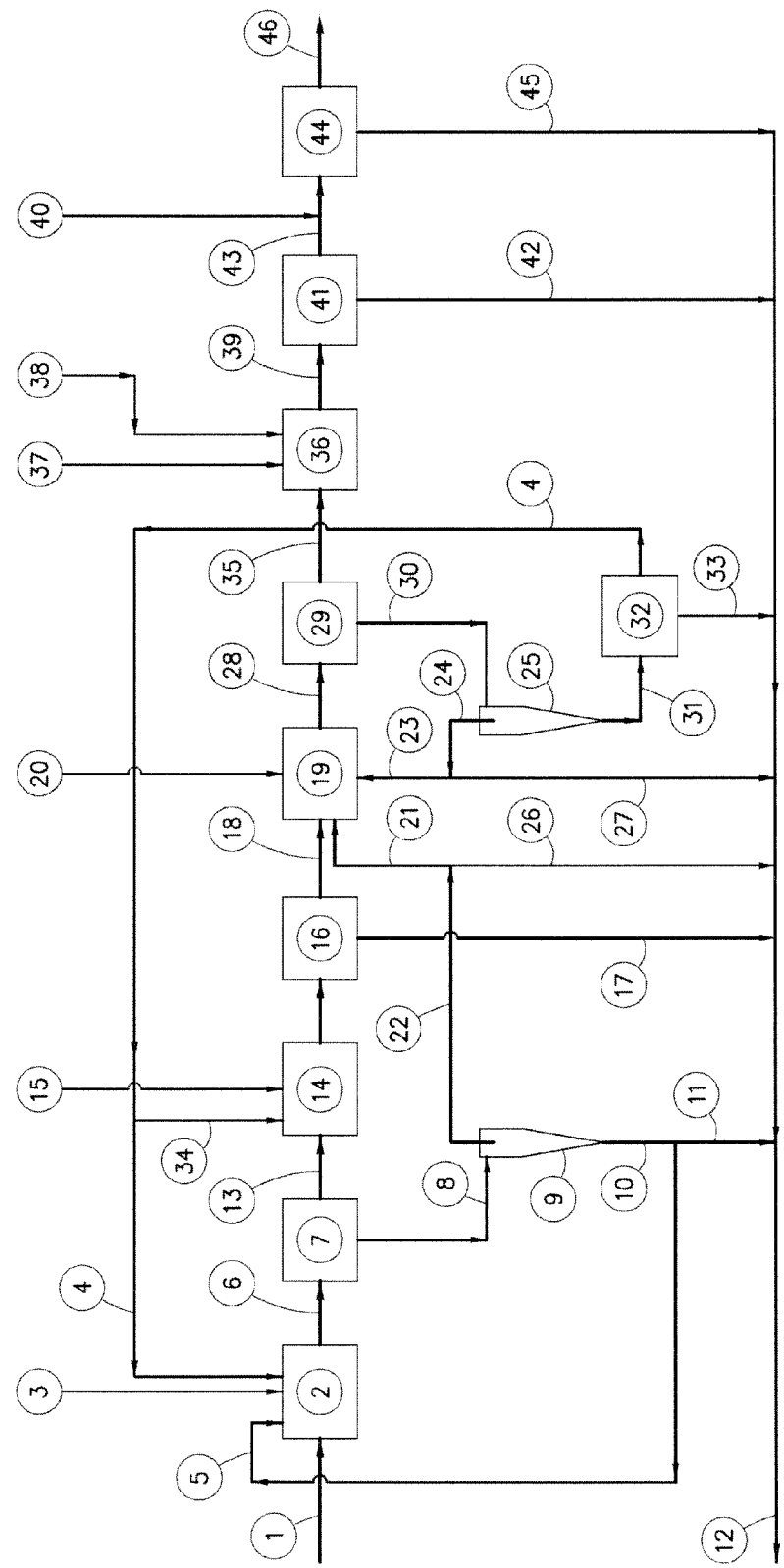
FIG. 2 depicts a diagram showing an alternative embodiment of the present invention including an additional reaction stage.

FIGS. 1 and 2 represent embodiments of the process of the present invention.

Example 1

New Process for Treatment of Sulphate-Rich Waters Utilizing Two Main Reaction Stages Looking at FIG. 1, high sulphate water enters as stream 1 into the first reaction stage 2. Also entering the first reaction stage is the input of lime or a suitable hydroxide containing material 3 and the ettringite recycle stream 4 from the further reaction stage 19. Optionally, a recycle stream 5 from the gypsum separation stage 9 can also be added. Stream 5 is able to provide a source of seed crystals into the first reaction stage 2. Also, it is able to recycle some of the ettringite that may not have been fully utilised within the first reaction stage 2. Further, when it is sourced from stream 10, as shown here, it is able to recover aluminium hydroxide to the first reaction stage and thence to stream 22.

The product 6 from the first reaction stage 2 is routed to the solids separation stage 7. Some of the separated solids 50 are routed as stream 8 to the gypsum separation stage 9. In this embodiment of the process it is assumed that a hydrocyclone based technology is utilised within the separation stage 9. The remainder of the separated solids 51 are routed to the solids discard 12.

The solids discard arrangement can utilise whatever facilities and technology that may be appropriate to the location and nature of the water treatment facility. For convenience, but only for convenience, the solids discard is shown here as a single facility that receives a combined stream that is made up from all the different residue streams 11, 26, 33, 42, 45 and 51. However, one or more of these residue streams could be routed separately or in combination(s) to one or more alternative facilities, as may be appropriate to the contents of the particular residue stream and to the location and nature of the water treatment facility.

A portion 5 of the gypsum concentrate 10 from the gypsum separation stage 9 can, if desired, be recycled to the first reaction stage 2, as noted above. Stream 5 could also be sourced from stream 50 or stream 51. The remainder of the gypsum concentrate 11 is routed to the solids discard 12.

The clarified water 18 from the solids separation stage 7 is then forwarded to the further reaction stage 19. The further reaction stage 19 also receives an additional input of lime and/or a calcium and/or hydroxide containing material 20; a portion 21, all or none of the $Al(OH)_3$ rich product 22 that is created within the separation stage 9 and, if appropriate, a portion 23 of the solids output 30 from the suspended solids separation stage 29 that follows the further reaction stage 19. Stream 23 can be sourced from either before or after the optional buffer storage facility 32.

Normally, a portion 23 of the solids output would only need to be returned to the reaction stage 19 if the reactor design for this reaction stage is unable to maintain a sufficient quantity of seed crystals within the reactor for optimum reaction conditions.

Depending upon the aluminium and the sulphate content of the process feed water stream 1, the aluminum content of the various reagents that are added to the process and/or the efficiency of the separation stage 9, it may be necessary to include a source of soluble aluminium within or alongside the overall reagent input stream 20.

If only a portion 21 of the aluminium hydroxide concentrate 22 is used within the further reaction stage 19, then the remainder 26 is routed to the residue discard 12. Preferably, but not shown here, the remainder 26 will be routed through a buffer storage facility so that a stock of recovered aluminum concentrate can be maintained for use within a process re-start or when there is a shortage of aluminium within the inputs to the process.

The reacted product 28 from the further reaction stage 19 is routed to a suspended solids separation stage 29. As noted above, some of the separated suspended solids 30 from separation stage 29 can be returned (stream 23) to the further reaction stage 19 as a source of seed crystals. The remainder 52 or all of the separated solids 30 can be routed to the buffer storage facility 32.

In many situations there will be more ettringite produced within the process than can be dissolved within the reaction stage 2. The excess can either be discharged as indicated by stream 33 or via another route (not shown here) to the discard facility 12, or to an alternative discharge facility.

The clarified water 35 from the suspended solids separation stage 29 are then passed to a further polishing reaction stage 36 where an appropriate ferric iron based or other appropriate treatment/final adjustment reagent 37 is added. Whenever necessary, in order to achieve the desired final pH, a controlled amount of a pH adjusting acidic reagent 38 would also be added. The reagent 37 may consist of a number of different reagents which are added as a blended mixture, individually or in partial combination. Similarly, the acidic reagent 38 may consist of a number of different reagents which are added as a blended mixture, individually or in partial combination.

The product 39 from the polishing reaction and pH reduction stage 36 is then routed to a further suspended solids removal stage 41 where the residues from the polishing reactions, including aluminium hydroxide from any unreacted aluminium, would be removed. The separated solids 42 from this suspended solids removal stage 41 would normally be routed to the residues discard 12. However, as this residue stream can often contain a significant proportion of aluminium hydroxide, it is sometimes appropriate to route these residues back to one of the previous reaction stages so as to reclaim the aluminium for further use. The selection as to which reactor to return them to will be situation specific and will be dependent on the nature and quantity of the other components that are removed within this polishing stage.

Normally, after this polishing reaction stage, it is necessary to carry out a further minor pH adjustment to the clarified output 43. In addition, it is sometimes necessary to add further components in order to satisfy any particular requirements that may be imposed by the discharge or re-use criteria. Any such further additions are shown as one or more inputs 40.

Within many of the discharges from industry and/or from mining activities, the dissolved nitrogen content may be too high for the proposed re-use or discharge criteria. This nitrogen can be present as both inorganic nitrogen containing compounds, organic nitrogen containing compounds or as a mixture of both. Other organic compounds could also be present, including phosphorous containing compounds. There are a number of well-established technologies for removing these contaminants and the selection of the appropriate technology or technologies will be dictated by the specific nature and quantities of the contaminants, the local circumstances, costs and operator preferences. Location 44 is the typical position within the above described overall treatment process where these nitrogen and other contaminating compounds would normally be removed. Any solid, sludge or other residues 45 from this location would normally join the overall residue discard 12, as shown. However, depending upon what has to be removed, it may be appropriate to route them, or some of them, to another process outlet.

The finally treated water 46 would then be available for re-use or discharge.

Example 2

New Process for Treatment of Sulphate-Rich Waters Utilizing Three Main Reaction Stages Turning to FIG. 2, high sulphate water enters at 1 into the first reaction stage 2. Also entering the first reaction stage is the input of lime or a hydroxide containing material 3, the ettringite concentrate 4 and, if desired, an aluminium containing recycle stream 5 from the gypsum separation stage 9. The product 6 from the reaction stage 2 is routed to the solids separation stage 7. The separated solids 8 are routed to the gypsum separation stage 9, which in this embodiment of the process it is assumed that a hydrocyclone based technology is utilised. A portion 5 of the gypsum concentrate 10 can be recycled to the first reaction stage 2 as noted above as a source of seed crystals. The remainder of the gypsum concentrate 11 is routed to the solids discard 12. As noted above, this discard arrangement can utilise whatever facilities and technology that may be appropriate to the location and nature of the water treatment facility.

The clarified water 13 from the solids separation stage 7 is then forwarded to the additional reaction stage 14 where additional ettringite 34 (see below), lime or a hydroxide containing material 15 is added. The precipitated solids that are created within this reaction stage are then separated within the second solids separation stage 16. The separated solids 17 are directed to the residue discard 12 and the clarified water 18 is passed on to the further reaction stage 19.

The further reaction stage 19 also receives an additional input of lime or a hydroxide containing material 20; a portion 21, all or none of the separated aluminium hydroxide concentrate 22 that is created within the separation stage 9, if appropriate, an additional source of aluminium and, if appropriate, a portion 23 of the fine solids output 24 from the optional ettringite separation unit 25. In this embodiment of the process it is also assumed that a hydrocyclone based technology is utilised. If only a portion 21 of the aluminium hydroxide concentrate 22 is used within the further reaction stage 19, then the remainder 26 is routed to the residue discard 12. Preferably, but not shown here, the remainder 26 will be routed through a buffer storage facility so that a stock of recovered aluminium concentrate can be maintained for use within a process re-start or when there is a shortage of aluminium within the inputs to the process.

Similarly, the portion 27 of the fine solids output 24 from the ettringite separation stage 25 that is not recycled to the further reaction stage 19 is also routed to the residue discharge 12. In this instance, less benefit can be achieved from a buffer storage facility for portion 27 relative to the benefit that can be obtained from a buffer storage facility for the portion 26. However, a suitable buffer facility could be provided for this portion 27.

The reacted product 28 from the further reaction stage 19 is routed to the third suspended solids separation stage 29. The separated suspended solids 30 from this third separation stage are routed to an optional ettringite separation unit 25 from where the separated concentrate of ettringite 31 is routed to an optional buffer storage facility 32. From this buffer storage facility 32, or directly, the concentrate 4 is directed back to the first reaction stage 2.

If, as noted above, there is an excess of aluminium available and if it is beneficial to the control of the ionic balance between sulphate and calcium, then an input of ettringite concentrate 34 to the additional reaction stage 14 can also be made. If there is an excess of ettringite concentrate, then the excess 33 can be routed to the residue discharge 12.

The clarified water 35 from the suspended solids separation stage 29 are then passed to a further polishing reaction stage 36 where an appropriate ferric iron based or other appropriate treatment/final adjustment reagent 37 is added together with a controlled addition of a pH adjusting acidic reagent 38. The reagent 37 may consist of a number of different reagents which are added as a blended mixture, individually or in partial combination. Similarly, the acidic reagent 38 may consist of a number of different reagents which are added as a blended mixture, individually or in partial combination.

The product 39 from the polishing reaction stage is then routed to a further suspended solids removal stage 41 where the residues from the polishing reactions would be removed together with any unreacted aluminium. The separated solids 42 from this suspended solids removal stage 41 would normally be routed to the residues discard. However, as this residue stream can often contain a significant proportion of aluminium hydroxide, it is sometimes appropriate to route these residues back to one of the previous reaction stages so as to reclaim the aluminium for further use. The selection as to which reactor to return them to will be situation specific and will be dependent on the nature and quantity of the other components that are removed within this polishing stage.

Normally, after this polishing reaction stage, it is necessary to carry out a further minor pH adjustment to the clarified output 43. In addition, it is sometimes necessary to add further components in order to satisfy particular requirements that may be imposed by the discharge or re-use criteria. Any such further additions are shown as one or more inputs 40.

Within many of the discharges from industry and/or from mining activities, the dissolved nitrogen content may be too high for the proposed re-use or discharge criteria. This nitrogen can be present as both inorganic nitrogen containing compounds, organic nitrogen containing compounds or as a mixture of both. Other organic compounds could also be present, including phosphorous containing compounds. There are a number of well-established technologies for removing these contaminants and the selection of the appropriate technology or technologies will be dictated by the specific nature and quantities of the contaminants, the local circumstances, costs and operator preferences. Location 44 is the typical position within the above described overall treatment process where these nitrogen and other contaminating compounds would be removed. Any solid, sludge or other residues 45 from this location would normally join the overall residue discard 12, as shown. However, depending upon what has to be removed, it may be appropriate to route them, or some of them, to another process outlet.

The finally treated water 46 would then be available for re-use or discharge.

The invention claimed is:

1. A process for the treatment of sulphate-containing water, the process including:
   a first reaction stage within which ettringite is used to precipitate precipitated solids from the sulphate-containing water, the precipitated solids being selected from the group consisting of metal compounds, phosphate compounds, sulphate compounds and combinations thereof;
   a suspended solids removal stage for removal of the precipitated solids produced by the first reaction stage;
   a further reaction stage including ettringite production from partially-treated sulphate-containing water from the first reaction stage and the addition of an aluminum containing reagent;
   a suspended solids removal stage for removal of precipitated solids produced by the further reaction stage;
   a particle separation stage within which some or all of the precipitated solids that are removed within the suspended solids removal stage are separated into an aluminum hydroxide-rich product and a product containing a remainder of the precipitated solids removed by the suspend solids removal stage; and
   recovery to the further reaction stage of a portion or all of the aluminum hydroxide-rich product as at least a portion of the aluminum containing reagent; and
   recovery of the ettringite produced by the further reaction stage for use in the first reaction stage.

2. The process of claim 1, wherein the particle separation stage is based on hydrocyclone technology.

3. The process of claim 1, wherein a portion of the product containing the remainder of the precipitated solids is returned to the first reaction stage.

4. The process of claim 3, wherein the portion of the product containing the remainder of the precipitated solids is subjected to a washing or leaching process using a portion of the sulphate-containing water.

5. The process of claim 1, wherein the first reaction stage further comprises a secondary removal stage for removal of the precipitated solids precipitated in the first reaction stage.

6. The process of claim 1, wherein an additional reaction stage is provided before the further reaction stage and where additional ettringite, lime, or hydroxide containing material is added to raise the pH.

* * * * *